Figure 1:
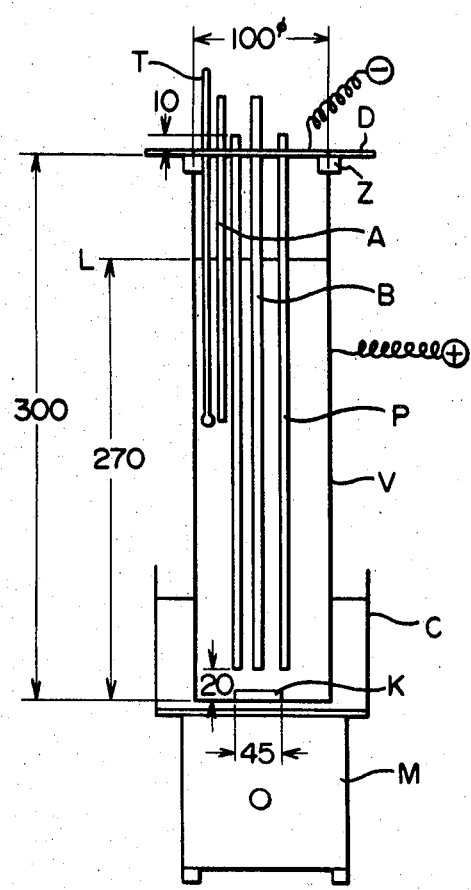

United States Patent [19]

Tominaga

[11] 4,296,010

[45] Oct. 20, 1981

[54] RESIN COMPOSITION FOR CATIONIC ELECTRODEPOSITING PAINTS

[75] Inventor: Akira Tominaga, Hiratsuka, Japan

[73] Assignee: Kansai Paint Co., Ltd., Hyogo, Japan

[21] Appl. No.: 116,780

[22] Filed: Jan. 30, 1980

[30] Foreign Application Priority Data

Mar. 26, 1979 [JP] Japan .................................. 54-34227

[51] Int. Cl.$^3$ .............................................. C08L 75/04
[52] U.S. Cl. ........................ 260/29.2 TN; 204/181 C;
    525/424; 525/528; 528/45; 525/424;528
[58] Field of Search .................. 260/29.2 TN; 528/45;
    525/424; 525/528; 204/181 C

[56] References Cited

U.S. PATENT DOCUMENTS

| | | | |
|---|---|---|---|
| 3,984,299 | 10/1976 | Jerabek | 260/29.2 TN |
| 4,031,050 | 6/1977 | Jerabek | 528/45 |
| 4,036,795 | 7/1977 | Tominaga | 528/45 |
| 4,134,865 | 1/1979 | Tominaga | 525/424 |
| 4,134,866 | 1/1979 | Tominaga | 260/29.2 TN |

*Primary Examiner*—Paul R. Michl
*Attorney, Agent, or Firm*—Wenderoth, Lind & Ponack

[57] ABSTRACT

A resin composition for cationic electrodepositing paints which has a high throwing power and does not foul a top coated film and is particularly suitable for two-coat finishing, said resin composition comprising the reaction product of

[A] a basic polyamino resin containing amino groups and/or hydroxyl groups capable of reacting with isocyanate groups, with

[B] a polyisocyanate mixture composed of
  (i) 40 to 95 mole % of a low-volatile partially blocked aromatic polyisocyanate containing at least two benzene rings having an isocyanate group directly bonded to a nuclear carbon atom, in which substantially all isocyanate groups except one are blocked with an alcohol,
  (ii) 2.5 to 60 mole % of a low-volatile fully blocked aromatic polyisocyanate containing at least two benzene rings having an isocyanate group directly bonded to a nuclear carbon atom, and
  (iii) 2.5 to 40 mole % of a difunctional polyisocyanate, the mole percentages being based on the total amount of the polyisocyanates (i), (ii) and (iii); and an aqueous bath for cationic electrodeposition comprising aforesaid resin composition, a water-soluble aqueous inorganic or organic acid as a neutralization agent for said resin composition, and an aqueous medium.

14 Claims, 4 Drawing Figures

U.S. Patent     Oct. 20, 1981     4,296,010

RESIN COMPOSITION FOR CATIONIC ELECTRODEPOSITING PAINTS

This invention relates to a resin composition for cationic electrodepositing paints. More specifically, this invention relates to a resin composition for cationic electrodepositing paints which does not foul a top coated film and has a high throwing power, and which is particularly suitable for use as a primer coating for two-coat finish.

In recent years, blocked isocyanate-curable cationic electrodepositing paints containing an epoxy resin as a base resin have been developed, and have been superseding conventional anionic electrodepositing paints because of their superior corrosion resistance. Since, however, blocked isocyanate-curable cationic electrodepositing paints now in commercial use all contain 2,4-tolylene diisocyanate or a mixture of it with 2,6-tolylene diisocyanate (80:20), the urethane linkage between the isocyanate and the base resin decomposes at high temperatures during heat curing of the coated film, and the tolylene diisocyanate skeleton is cleaved from the base resin and dissipates from it. When an article to be coated is of a complicated profile, such as an automotive body, a part of the tolylene diisocyanate moiety condenses at an especially intricate part of the surface of the coated article. This heat-decomposition product is usually basic, and is colored dark by a chemical action such as oxidation or polymerization. Accordingly, it will foul a top coat applied in the subsequent step, and in an extreme case, will inhibit the heat curing reaction of the top coat itself, thus deteriorating the performance of the top coat.

Moreover, when a high temperature is used in the subsequent step as in coating with a powder paint, the heat decomposition product generated from the primer coated film penetrates into the top coat by the effect of the high temperature, thus causing the so-called "bleeding" effects.

The aforesaid defect of the electrodepositing primer coating in a three coat process comprising primer coating by electrodeposition, intermediate coating and top coating does not pose so serious a problem because it is hidden by the intermediate coating. This defect, however, is serious in a two-coat coating process consisting of electrodeposition of a primer coating and subsequent application of a top coating.

As one way of remedying the aforesaid defect of a blocked isocyanate-curable cationic electrodepositing paint described hereinabove, the present inventor attempted to use polyisocyanates generally called "non-yellowing isocyanates", such as aliphatic polyisocyanates (e.g., hexamethylene diisocyanate) and alicyclic polyisocyanates (e.g., isophorone diisocyanate), instead of tolylene diisocyanates now in use. Resins obtained by partially blocking these polyisocyantes with alcohols and combining them with an epoxy resin base have a high alcohol block dissociating temperature, and curing of these resins requires a far higher curing temperature than conventional blocked isocyanate-curable type using tolylene diisocyanates. Moreover, the corrosion resistance of coated films prepared by using the resins is extremely low. Such coated films cannot be used in practical applications.

Generally, various suggestions have been made in the past about compositions for cationic electrodeposition coatings. For example, the specification of Japanese Examined Patent Publication No. 25488/75 discloses an electrodeposition coating composition which is a dispersion in an aqueous medium of particles of a coating material composed of an amino-containing polyamides) and a blocked polyisocyanate (a fully blocked isocyanate resulting from the blocking of substantially all of the isocyanate groups). An electrodeposited film prepared from this composition does not have satisfactory corrosion resistance, and the Publication states that in order to remedy this defect, not more than 50% by weight, based on the composition, of a polyepoxide may be used. In this case, too, it is difficult to keep the stability of the bath during continuous electrodeposition coating. Furthermore, this Japanese Patent Publication does not at all disclose anything about the fouling of a top coated film which is the problem to be solved in this invention, and the composition disclosed in the Japanese Patent Publication is unsatisfactory for practical purposes.

Japanese Unexamined Patent Publication No. 759/72 discloses a method of electroplating using an aqueous bath of a composition comprising a soluble polyamine resin (a polyamide resin substantially containing an amino group) and a blocked polyisocyanate, which composition is similar to the aforesaid composition for electrodeposition. This composition also shows similar properties to those shown in the above-cited Japanese Examined Patent Publication No. 25488/75.

It is widely known that cured polyepoxides such as a resin composition based on a bisphenol A-epichlorohydrin type epoxy resin have superior corrosion resistance and adhesion. A method has already been known to neutralize an adduct between an epoxy resin and a primary or secondary amine with an acid to water-solubilize it. As an electrodepositing coating composition utilizing these properties of the polyepoxide and the additives, Japanese Unexamined Patent Publication No. 103135/76 discloses an aqueous electrodepositing composition comprising a mixture of such an epoxy resin/amine adduct and a (fully) blocked polyisocyanate. An electrodeposited film prepared from this composition has superior corrosion resistance. Since, however, the composition contains a very small amount of plasticizing components, the surface smoothness of the resulting film and the stability of the electrodeposition bath (the property of the bath to maintain the homogeneity of a coated surface, the thickness of the deposited film, the resistance properties of the coated film, etc. within the desired ranges without a particular change, especially deterioration, in these properties) are unsatisfactory. Furthermore, the composition has a low throwing power in coating articles of complex profiles. Furthermore, this Unexamined Patent Publication does not at all disclose anything about the fouling of the top coating which becomes a problem in this invention, and the composition disclosed is unsatisfactory for practical applications.

Japanese Examined Patent Publication No. 6306/77 describes a self-curing electrodepositable aqueous coating composition comprising an epoxy resin, a primary amine and/or a secondary amine, and a partially blocked polyisocyanate. This composition can be regarded as an improvement over the composition described in the above-cited Japanese Examined Patent Publication No. 103135/76. However, no sufficient improvement is provided by this composition in regard to the surface smoothness and flexibility of the coated film, and the stability and the throwing power of the coating composition, and the composition is not entirely satisfactory for industrial application. This Patent Publication, however, does not disclose anything about the fouling of the top coated film, and the performances of the composition disclosed is much the same as that disclosed in Japanese Unexamined Patent Publication 103135/76.

Japanese Unexamined Patent Publication No. 11228/77 discloses an aqueous composition for electrodeposition obtained by reacting an epoxy resin with a polyamine derivative containing primary and secondary amino groups blocked with ketimine groups, followed by the addition reaction of the resulting product with a partially capped polyisocyanate. This composition also shows much the same properties as those disclosed in Japanese Examined Patent Publication No. 6306/77. Moreover, it gives no teaching about resistance to fouling of a top coat.

In an attempt to remedy the defects of the compositions disclosed in the above-mentioned patent documents, the present inventor suggested in the specification of Japanese Examined Patent Publication No. 8568/78 a resin composition for cationic electrodepositing paints obtained by reacting or mixing an amide-added epoxy resin with an amino-containing polyamide resin, followed by the addition reaction of a partially blocked polysicyanate. This resin composition provided marked improvements in the flexibility and corrosion resistance of electrodeposited films prepared from the resin composition, but there is still room for improvement in regard to the stability and throwing powder of the electrodeposition bath. Moreover, this Patent Publication lacks any consideration to the fouling of top coated films.

As an electrodepositing coating composition having similar constituent ingredients to the composition disclosed in Japanese Examined Patent Publication No. 8568/78, the patent inventor disclosed in Japanese Unexamined Patent Publications Nos. 77144/77 and 101238/77 a cationic electrodepositable resin composition comprising as a main ingredient a mixture of (1) the reaction product of at least two of (a) the reaction product between an epoxy resin and a basic amino compound, (b) a basic amino-containing polyamide and (c) a partially blocked isocyanate, with (2) the remaining component (a), (b) or (c). This resin composition provided a greater improvement than the composition disclosed in Japanese Examined Patent Publication No. 8568/78 excepting the resistance to fouling of top coated films. The properties of an electrodeposited film formed from the resin composition still leave room for improvement, and the problem of the fouling of top coated films is not solved.

Japanese Unexamined Patent Publication No. 121640/77 whose inventorship includes the present inventor suggested a technique of providing a coated film having markedly improved smoothness without impairing its corrosion resistance by incorporating a polyether having specified properties to a composition comprising an amine-added epoxy resin, a fatty acid or an amino-containing polyamide resin, and a partially blocked polyisocyanate. However, the throwing power of this improved composition in continuous electrodeposition still leaves room for improvement, and the problem of the fouling of the top coated films is not solved.

The present inventor has made extensive investigations in order to develop a blocked isocyanate-curable cationic electrodepositing coating composition especially suitable as a primer for "two-coat finishing" which has a high throwing power, and does not foul the top coated films nor deteriorate the properties of the top coated films. It has now been found that the above object can be achieved by using a specified polyisocyanate containing at least two benzene rings each of which contains at least one isocyanate group directly bonded to a nuclear carbon atom.

Thus, according to this invention, there is provided a resin composition for cationic electrodepositing paints which has a high throwing power and does not foul a top coated film and is particularly suitable for two-coat finishing, said resin composition comprising the reaction product of

[A] a basic polyamino resin containing an amino group and/or a hydroxyl group capable of reacting with isocyanate groups, with

[B] a polyisocyanate mixture composed of
  (i) 40 to 95 mole% of a low-volatile partially blocked aromatic polyisocyanate containing at least two benzene rings having an isocyanate group directly bonded to a nuclear carbon atom, in which substantially all isocyanate groups except one are blocked with an alcohol,
  (ii) 2.5 to 50 mole% of a low-volatile fully blocked aromatic polyisocyanate containing at least two benzene rings having an isocyanate group directly bonded to a nuclear carbon atom, and
  (iii) 2.5 to 40 mole% of a difunctional polyisocyanate, the mole percentages being based on the total amount of the polyisocyanates (i), (ii) and (iii).

The basic polyamino resins (to be referred to as a "base resin") used in this invention contains at least two basic amino groups per molecule and at least one amino group (primary or secondary amino group) and/or at least one hydroxyl group capable of reacting with an isocyanate group. There can be used any basic polyamine resins which contain a sufficient number of basic amino groups for the formation of a stable aqueous dispersion upon neutralization with an acid. Such a base resin may have an amine value of generally 60 to 600 mgKOH/g, preferably 60 to 300 mg KOH/g, and a hydroxyl value of generally 60 to 1200 mg KOH/g, preferably 60 to 600 mg KOH/g.

Examples of these basic polyamine resins include
  (i) an adduct of a polyepoxide and a monoamine or polyamine containing at least one basic amino group, or a polyadduct between a polyepoxide and a polyamine containing at least two basic amino groups (see Japanese Examined Patent Publication No. 23807/74);
  (ii) a polycondensate of a polycarboxylic acid and a polyamine containing at least two basic amino groups (see U.S. Pat. No. 2,450,940);
  (iii) a polyadduct derived from a polyisocyanate, a polyol and a monoamine or polyamine containing at least one basic amino groups;
  (iv) a copolymer of a basic amino-containing acrylic or vinyl monomer (see Japanese Patent Publications Nos. 12395/70 and 12396/70);
  (v) an adduct derived from a polycarboxylic acid resin and an alkyleneimine (U.S. Pat. No. 3,403,088); and
  (vi) a combination of two or more of these resins.

Specific examples of these basic polyamine resins and methods for their production are disclosed in known patent documents such as Japanese Examined Patent Publications Nos. 12395/70, 12396/70 and 23807/74, and U.S. Pat. Nos. 2,450,940, 3,403,088, 3,891,529 and 3,963,663. Hence, these documents are cited herein in lieu of a description of specific examples of the basic polyamine resins and methods for their production.

Suitable base resins are adducts formed between glycidyl ether-type epoxy resins obtained by the reaction of polyphenols such as 2,2-bis(4-hydroxyphenyl)propane [bisphenol A] and bis(4-hydroxyphenyl)methane [bisphenol F] and epihalohydrins such as epichlorohydrin and monoamines or polyamines containing at least one basic amino group. Examples of monoamines or polyamines to be reacted with the epoxy resins include monoethylamine, diethylamine, n-propylamine, monoethanolamine, diethanolamine, N-methylaminoethanol, isopropanolamine, diisopropanolamine, ethylenediamine, triethylenediamine, tetraethylenetriamine, N-hydroxyethylenediamine and propylenediamine.

A preferred base resin used in this invention is the reaction product between the amine-added epoxy resin and the basic polyamide resin. In the production of this reaction product, it is advantageous that some of the epoxy groups of the epoxy resin are reacted in advance with the monoamine or polyamine, and the remaining epoxy groups which are left to an extent not to cause gellation are reacted with the basic polyamide resin.

In the present application, the term "reaction product" is meant to include not only a complete reaction product of two or more reaction components, but also a product which contains unreacted components.

Preferred epoxy resins have a molecular weight of generally about 200 to about 4,000, preferably about 400 to about 2,000, and an epoxy equivalent of generally 100 to 2,000, preferably 200 to 1,000. For example, those sold by Shell Chemical Company under the tradenames Epikote 828, Epikote 1001, Epikote 1004 and Epikote 1007 can be advantageously used.

Amines to be reacted with the epoxy resins are those which contain basic amino groups, namely have at least one active hydrogen capable of reacting with an epoxy resin in the amino groups, i.e. those which contain at least 1, preferably 1 to 3 primary amino groups (—NH$_2$) or secondary amino groups (—NHR). The monoamines or polyamines exemplified hereinabove can be used. Of these, aliphatic monoamines such as diethylamine, dipropylamine, diethanolamine, monoethylamine and monoethanolamine are preferred.

Suitable basic polyamide resins are those having an amine value of generally 50 to 500, preferably 100 to 400, and a number average molecular weight of generally about 500 to about 5,000, preferably about 600 to about 3,000 which are obtained by condensation of polybasic fatty acids, such as polymerized linoleic acid (dimeric acid) or maleinized fatty acids, and at least an equimolar amount thereto of polyalkylene polyamines such as diethylene triamine, triethylene tetramine and tetraethylene pentamine. Desirably, these basic polyamine resins are ketiminated at the primary amino groups prior to reaction with the amine-added epoxy resins.

By using the reaction product of the amine-added epoxy resin and the basic polyamide resin in this invention as a base resin, a self-curable cationic electrodepositing paint can be provided which is suitable as a two-coat finishing, has a high throwing power and which produces coated films having smoothness and superior properties. The base resin that can be used in this invention is not limited to the aforesaid type, but can be selected from a wide range of resins which contain an amino group and/or a hydroxyl group capable of reacting with an isocyanate group.

The amounts of the amino groups and/or hydroxyl groups capable of reacting with an isocyanate group which can be present in the base resin can be varied over a wide range. Generally, 1 to 10, especially 1 to 5, basic amino groups (an amine value of 60 to 600, preferably 60 to 300) and 1 to 20 hydroxyl groups, preferably 1 to 10 hydroxyl groups (a hydroxyl value of about 60 to 1200, preferably 60 to 600) can be present per 1,000 g of the base resin.

The base resin may generally have a number average molecular weight of 250 to 10,000, preferably 500 to 5,000.

The isocyanate compounds to be reacted with the base resin are described below.

As a main isocyanate compound, there is used a low-volatile aromatic polyisocyanate containing at least two benzene rings having at least one isocyanate group directly bonded to a nuclear carbon atom. The benzene rings may be independent from each other or fused as in a naphthalene or anthraquinone ring. Usually, one isocyanate group (—NCO) is present on the benzene ring, but two or more isocyanate groups may be present on the benzene ring. The aromatic polyisocyanate may have a benzene ring not containing an isocyanate group. The benzene rings may be bonded directly or through a carbon-carbon bond, ether linkage, etc.

Preferably, the aromatic polyisocyanate, as a whole, has 2 to 3 isocyanate groups and generally has a molecular weight of 200 to 600, especially 250 to 500.

Suitable aromatic polyisocyanates that can be used in this invention include those of the following general formulae:

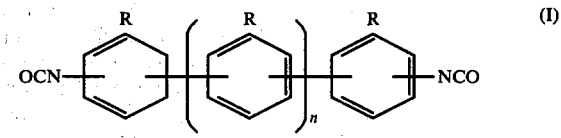

(I)

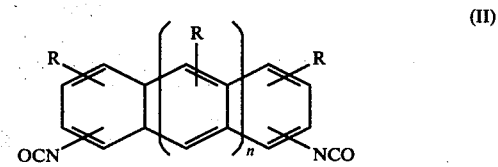

(II)

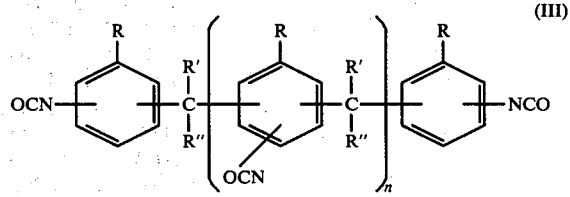

(III)

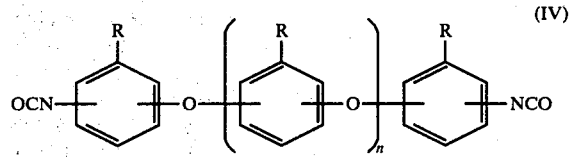

(IV)

-continued

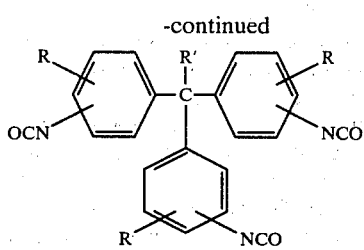

In the above formulae, R, R' and R" each represent a hydrogen atom, a lower alkyl group (preferably a methyl group), or a lower alkoxy group (preferably a methoxy group), and n is 0 or an integer of 1 to 4 (preferably 0 or an integer of 1 or 2.

In the present specification and the appended claims, the term "lower" means that a group or compound qualified by this term contains not more than 9 carbon atoms, preferably not more than 5 carbon atoms.

Typical examples of the aromatic polyisocyanate include 4,4'-biphenyl diisocyanate, 1,5-naphthalene diisocyanate, 4,4'-diphenylmethane diisocyanate, 2,4'-diphenylmethane diisocyanate, bis(3-methyl-4-isocyanatophenyl)methane, bis(3-methoxy-4-isocyanatophenyl)methane, 2,2-bis(4'-isocyanateophenyl)propane, 4,4'-diphenylether diisocyanate, and tris(4-isocyanatophenyl)methane. From the standpoint of commercial availability, 4,4'-diphenylmethane diisocyanate is preferred.

According to this invention, the aromatic polyisocyanate is blocked with an alcohol prior to introduction into the base resin. Blocking with an alcohol is performed in two different modes. According to one mode, the aromatic polyisocyanate is partially blocked so that one isocyanate group is left in the free state, and in the other embodiments, it is completely blocked so that substantially no isocyanate groups remain.

Examples of the alcohol used for blocking the aromatic polyisocyanate include aliphatic alcohols such as ethanol, n- or iso-propanol, n-, iso-, sec- or tert-butanol, 2-ethylhexanol, ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monoisopropyl ether, diethylene glycol monobutyl ether, propylene glycol monomethyl ether, propylene glycol monoethyl ether, propylene glycol monopropyl ether and propylene glycol monobutyl ether; alicyclic alcohols such as cyclohexyl alcohol; and araliphatic alcohols such as benzyl alcohol. Of these, lower aliphatic monoalcohols are especially preferred.

The reaction for the blocking of the aromatic polyisocyanate with the alcohol is known per se, and can, for example, be carried out generally at relatively low temperature ranging from room temperature to 100° C. in the absence of a solvent, or in an inert organic solvent such as toluene, xylene, dioxane, methyl ethyl ketone or ethyl acetate. If desired, the reaction may be carried out in the presence of a urethanization catalyst such as dibutyltin diacetate or dibutyltin dilaurate.

In addition to the aforesaid partially or completely blocked aromatic polyisocyanates, a non-blocked difunctional polyisocyanate is used as a polyisocyanate component. Any difunctional polyisocyanates containing two free isocyanate groups may be used in this invention. They may be selected from the aromatic polyisocyanates of formulae (I), (II), (III), and (IV) above, or from polyisocyanates of other structures. Products obtained by blocking the isocyanates groups of triisocyanates or higher isocyanates with alcohols or amines can also be used.

The difunctional polyisocyanates may be any of aliphatic, alicyclic, aromatic and araliphatic diisocyanate compounds. Specific examples of these diisocyanates are given below.

Aliphatic diisocyanates

OCN—(CH$_2$)$_a$—NCO (a = 2 – 12),
OCN—CH$_2$—CH$_2$—S—CH$_2$—CH$_2$—NCO,

OCN—CH$_2$—CH(CH$_3$)—CH$_2$—CH$_2$—NCO,
OCN—CH$_2$—CH$_2$—CH$_2$—O—CH$_2$—CH$_2$—CH$_2$—NCO, and
lysine diisocyanate.

Alicyclic diisocyanates

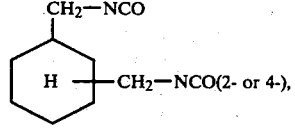

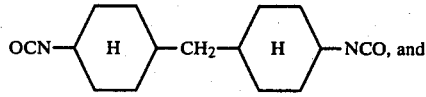

isophorone diisocyanate,

Aromatic diisocyanates

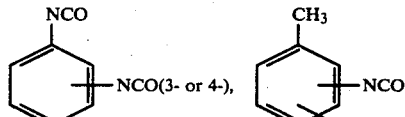

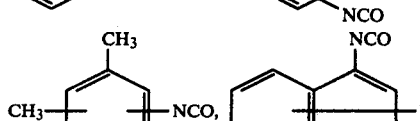

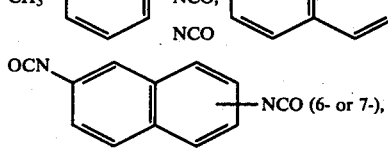

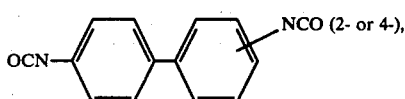

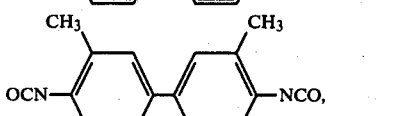

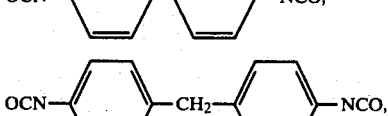

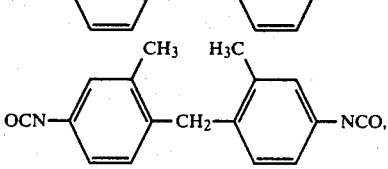

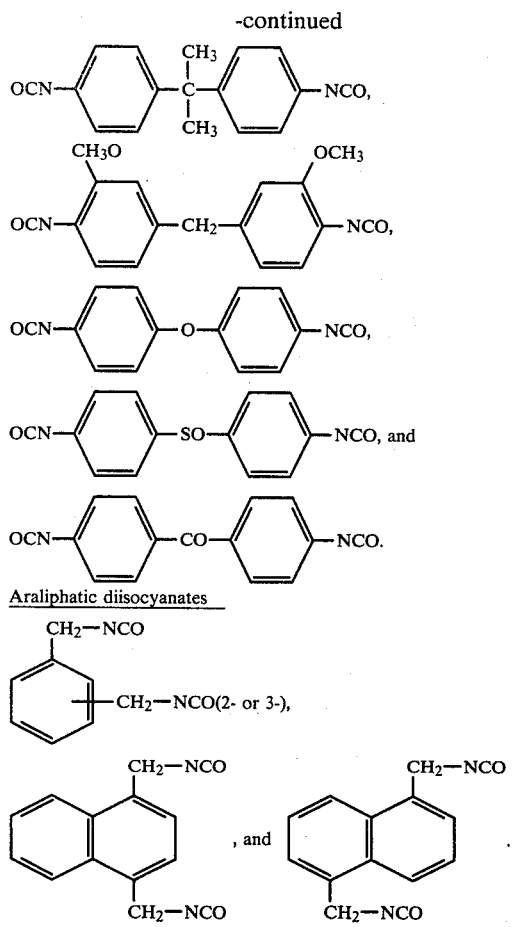

Araliphatic diisocyanates

These diisocyanate compounds can be used either singly or in combination with one another.

Especially preferred difunctional isocyanates for use in this invention include 4,4'-biphenyl diisocyanate, 1,5-naphthalene diisocyanate, 4,4'-diphenylmethane diisocyanate, 2,4'-diphenylmethane diisocyanate, bis(3-methyl-4-isocyanatophenyl)methane, bis(3-methoxy-4-isocyanatophenyl)methane, 2,2-bis(4-isocyanatophenyl)propane, 4,4'-diphenyl ether diisocyanate, tris(4-isocyanatophenyl) methane, hexamethylene diisocyanate, lysine diisocyanate, isophorone diisocyanate and xylylene diisocyanate.

Thus, the isocyanate compound that can be introduced into the base resin in accordance with this invention may be comprised of
(i) a low-volatile partially blocked aromatic polyisocyanate,
(ii) a low-volatile completely blocked aromatic polyisocyanate, and
(iii) a difunctional polyisocyanate.

These isocyanates are used in an amount of 40 to 95 mole%, preferably 50 to 90 mole%, for (i); 2.5 to 50 mole%, preferably 5 to 45 mole%, for (ii); and 2.5 to 40 mole%, preferably 5 to 25 mole%, for (iii).

The same kind of aromatic polyisocyanates may be used as the polyisocyanates (i), (ii) and (iii). If at this time, polyisocyanates whose isocyanate groups have much the same reactivity with alcohols are selected, a mixture of the polyisocyanates (i), (ii) and (iii) can be produced in one step.

Preferably, the introduction of the polyisocyanate compounds (i), (ii) and (iii) into the base resin is performed in one step by reacting them with one another each other simultaneously in the same reactor. Alternatively, it is possible to prepare a mixture of the polyisocyanates (i) and (ii), add the polyisocyanate (iii) to it, and to react the resulting polyisocyanate mixture with the base resin simultaneously within the same reactor. Or the polyisocyanates (i), (ii) and (iii) may be reacted stepwise with the base resin in any desired sequence. For example, it is possible to react a mixture of the polyisocyanates (i) and (ii) with the base resin, and thereafter, add the polyisocyanate (iii) to the reaction mixture obtained. The reaction product obtained by simultaneously reacting the base resin and a mixture of the polyisocyanates (i), (ii) and (iii) in one reactor by a one-pot process generally gives a paint having a high throwing paper, and is therefore preferred.

A treatment for introducing the isocyanate compound into the base resin can usually be carried out in a hydrophilic inert organic solvent at a relatively low temperature in the range of from room temperature to 100° C. Suitable inert organic solvents include, for example, ketones such as methyl ethyl ketone, 4-methoxy-4-methylpentanone-2 and cyclohexanone; ethers such as dioxane, ethylene glycol diethyl ether and diethylene glycol diethyl ether; esters such as ethyl acetate and ethylene glycol monoethyl acetate; and alcohols such as isopropanol, sec-butanol, tert-butanol and propylene glycol monomethyl ether. They can be used either singly or as a mixture of two or more. The amount of the organic solvent is not particularly limited. But in view of the throwing power of an electrodeposition paint and the cratering or pinholing of a coated surface caused by solvent-popping, it is generally advantageous to use it in an amount of not more than 60 parts by weight per 100 parts by weight of the base resin.

The amount of the isocyanate compounds based on the base resin can be varied depending upon the types of the base resin and/or isocyanate compounds used within a range from the minimum amount required for the resulting reaction product to self-cure under heat to the maximum amount at which during the reaction, gellation does not occur nor the viscosity of the reaction mixture becomes too high. Generally, the preferred amount is such that the number (equivalent number) of blocked isocyanate groups introduced into the reaction product is about ½ to 1 time the total amount (equivalent number) of unreacted primary and secondary amino groups (i.e., the amino groups capable of reacting with isocyanate groups) and/or hydroxyl groups in the base resin.

The reaction product is generally a resin composition having an amine value of 15 to 300 mgKOH/g, preferably 30 to 150 mg KOH/g, and/or a hydroxyl value of 15 to 900, preferably 30 to 450.

The base resin into which the isocyanate compounds have thus been introduced can be used as a vehicle resin composition for blocked isocyanate-curable cationic electrodeposition paints. The resin composition obtained can be directly used as a composition for clear electrodeposition coating. Generally, it can be used as a composition for electrodeposition coating by adding a pigment and other conventional additives. Pigments which are usually used in electrodeposition paints can all be used. Examples include coloring pigments such as red iron oxide, titanium white and carbon black, extender pigments such as talc, clay and mica, and corrosion inhibiting pigments such as lead chromate, strontium chromate and lead silicate. They can be used in any desired amounts. An organic or inorganic acid salt of lead, tin, bismuth, iron, manganese, etc. can be added as a curing promoter. Usually, a surface active agent needs not to be added to the present composition. If desired, a small amount of a known surface active agent such as a nonionic surfactant which is usually employed in cationic electrodeposition paints may be added.

The electrodepositing resin composition prepared as above can be formed into a stable electrodeposition aqueous bath by neutralizing it with an aqueous solution of an organic acid such as formic acid, acetic acid, hydroxyacetic acid, propionic acid, butyric acid, or lactic acid or an inorganic acid such as phosphoric acid, sulfuric acid or hydrochloric acid. The amount of the acid required for neutralization is at least that which is required to dissolve or finely disperse stably the aforesaid resin composition as a film-forming component in an aqueous medium, and is not more than the equivalent weight of the basic amino groups present in the resin composition. Specifically, the preferred amount of the acid is about 0.1 to 0.6 equivalent based on the amine value of the resin composition. Advantageously, the resin composition is neutralized until the pH of the resulting aqueous bath reaches generally about 3 to about 8, preferably about 5 to about 7.

When the composition of this invention is neutralized with an acid and dissolved or dispersed in an aqueous medium, the total resin solids concentration in the aqueous bath is generally 3 to 30% by weight, preferably 5 to 15% by weight.

The cationic electrodepositing composition so prepared can be advantageously used as a primer for an automobile body, especially as a primer for two-coat finishing.

The aqueous bath for electrodeposition coating which has thus been prepared can be used as a primer electrodepositing bath which can be electrodeposited cathodically on an article to be coated.

Methods and apparatuses which have been used heretofore in cathodic electrodeposition can be used to perform electrodeposition from this aqueous bath. An article to be coated is used as a cathode, and desirably, a carbon plate, as an anode. Requirements for the electrodeposition coating practise are not particularly limited. Generally, the electrodeposition coating is desirably performed under the following conditions.

Temperature of the bath: 20° to 30° C.
Voltage: 100 to 400 V (preferably 200 to 300 V)
Current density: 0.01 to 3 A/dm$^2$
Time during which an electric current is passed: 1 to 5 minutes
Ratio of the area of the anode to that of the cathode: 2:1 to 1:2
Distance between the electrodes: 10 to 100 cm
Condition of the bath: agitated The coated film deposited on the cathodic article is washed, and then cured by baking it at about 140° to about 250° C., preferably about 170° to about 200° C. During the baking process, the blocked isocyanate groups present in the resin of the coated film releases the blocking agent such as alcohol, and is crosslinked with amino groups, amide groups, hydroxyl groups, etc. present in the resin.

The electrodepositable resin composition provided by this invention can be used to coat various metallic articles. It can be applied to an ordinary steel substrate treated with zinc phosphate, and is especially suitable for application to steel substrates which are susceptible to corrosion, such as steel substrates treated with iron phosphate or bare steel substrates. By using the composition of this invention, a coated film having outstanding corrosion resistance can be applied to these steel substrates with a high throwing power.

The electrodepositable resin composition of this invention exhibits very good performance as a primer for an automobile body, particularly as a primer coating in two-coat finish. The electrodepositable resin composition of this invention does not foul a top coating nor deteriorates the performances of the top coating. It also has a high throwing power.

The following examples illustrate the present invention in more detail. In these examples, all parts and percentages are by weight.

The two-coat yellowing, throwing power, salt spray resistance and impact strength of the paint compositions obtained by the following examples were measured or determined by the following methods.

(1) Yellowing test (two-coat)

A sample paint was electrodeposited on an iron pipe having a diameter of 50 mm, a length of 100 mm and a thickness of 0.8 mm until a coated film having a thickness of about 20 microns was obtained on its outside surface. Both ends of the pipe were sealed with an iron plate, and the coated film was baked under the baking conditions for the electrodeposited film. Separately, a top coating paint was coated on an iron plate having a size of 100 mm × 150 mm.

The two coated samples were set for 20 to 30 minutes., and the iron plate at one end of the pipe was removed. The pipe was placed on the top coated plate with the open end facing the top coated plate so that the distance between the open end of the pipe and the top coated plate was 0.8 mm. The assembly was baked under the baking conditions for the top coated film. After baking, the degree of discoloration at that portion of the top coated area which corresponded to the opening of the pipe was observed, and rated on the following scale.

E: No change (Excellent)
G: Slight discoloration noted (Good)
F: Discoloration noted, but the general appearance of the top coat is in the range of practical usage. (Fair)
P: Heavy yellowing, and the top coat is not in the range of practical use. (Poor)
B: Very heavy yellowing. (Bad)

(2) Testing method for throwing power (pipe method)

Figures 2, 3:
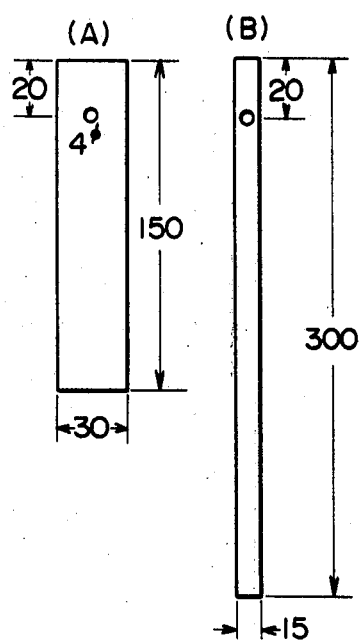

A testing device for throwing power is illustrated in FIGS. 1 to 3 of the accompanying drawings. In the drawings, the symbols represent the following parts.

V: a non-magnetic stainless steel cylindrical vessel ($\phi=100$ mm, t=1)
Z: an insulator
D: a supporting rod ($\phi=3$ mm, h=170 mm)
P: a nonmagnetic stainless pipe ($\phi=16$ mm, h-340 mm, t=1 mm)
A: an outside plate for measuring film thickness (30×150×0.8 mm) (see FIG. 2)
B: an inside plate for measuring throwing power (15×300×0.4 mm) (see FIG. 3)
T: a mercury thermometer (50° C. scale)
K: a rotator
C: a plastic water tank for cooling
M: a magnetic stirrer L: the liquid level of the electrodeposition bath.

The procedure of operation is as follows:

(1) Put the sample into the stainless steel cylindrical vessel V shown in FIG. 1 to a height of L (27 cm) from the bottom. Adjust its temperature to a specified value (usually 30° C.), and stir it uniformly (the bath temperature 30° C.).

(2) Fit the outside plate A, pipe D and inside plate B into the support rod D, and put them into the vessel V.

(3) Set an anode and the cathode in place, and make sure that there is no short-circuiting.

(4) Increases the voltage over the course of 10 seconds from 0 to a predetermined point at which the film thickness on the outside plate becomes 20 to 25 microns. At this time, adjust the rate of increasing the voltage so that the current does not exceed 10 A.

(5) Turn off a switch after passing a current for 3 minutes, and wash the outside plate, the inside plate and the pipe with water.

(6) Bake and dry the outside plate and the inside plate.

(7) Wash the pipe with a solvent in two stages. In particular, wash the inside surface of the pipe well.

Figure 4:
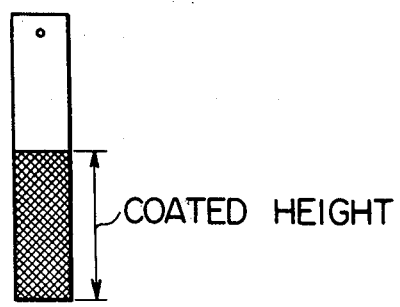

(8) Measure the height of the coating formed on the inside plate (see FIG. 4).

(3) Salt spray resistance

Tested in accordance with JIS Z 2371. When the creep width from the cut portion (linear scratch) was 2.0 mm on one side and blister of a coated film in parts other than the cut portion was less than 8F (ASTM), the tested sample was regarded as acceptable.

(4) Impact strength (Du Pont method)

A coated test plate was placed for 24 hours in a constant-temperature constant-humidity chamber at a temperature of 20°±1° C. and a humidity of 75±2%. A receiving stand and an impact center of predetermined sizes were secured to a Du Pont impact tester. The test plate was held between them with the coated surface facing upward. Then, a load of a predetermined weight was let fall onto the impact center. When no crack or peeling owing to the impact was noted in the coated film, the test plate was regarded as acceptable.

(5) Method for measuring the isocyanate group content

About 0.5 g of a sample having isocyanate groups (NCO) is accurately weighed, and placed in a flask with a ground stopper. It is then dissolved in 10 ml of dioxane (chemical pure, reagent grade). Then, 10 ml of a 2/10 N dioxane solution of dibutylamine is accurately added. The mixture is heated at 80° C. for 30 minutes with shaking. Then, 100 ml of isopropyl alcohol (chemical pure, reagent grade) is added, and the excess of dibutylamine is titrated with 1/10 N hydrochloric acid using bromophenol blue as an indicator until the blue color of the solution turns yellowish green. A blank test is also conducted without adding the sample.

The NCO content is calculated in accordance with the following equation.

$$\text{NCO content} = \frac{(A - B) \times 0.0042 f \times 1000}{W}$$

wherein

A is the amount (ml) of N/10 hydrochloric acid required to neutralize 2/10 N dibutylamine in the blank test;

B is the amount (ml) of N/10 hydrochloric acid used in the titration of the sample;

0.0042 is the amount (mg) of isocyanate groups corresponding to 1 ml of N/10 hydrochloric acid;

f is the factor of hydrochloric acid; and

W is the amount (g) of the sample.

EXAMPLE 1

Two-hundred and fifty (250) parts of 4,4'-diphenylmethane diisocyanate (abbreviated MDI) was dissolved in 50 parts of methyl ethyl ketone. At 40° C., 112.5 parts of ethylene glycol monoethyl ether was added, and the reaction was performed until the remaining isocyanate group content became 8.7%. GPC analysis (gel permeation chromatography) of the product showed that a polyisocyanate mixture (I) was obtained which consisted of about 55 mole% of partially blocked MDI (i.e., mono-adduct), about 35 mole% of completely blocked MDI (i.e., di-adduct) and about 10 mole% of unreacted MDI.

Five hundred (500) parts of a bisphenol A-type epoxy resin having an epoxy equivalent of 500 and a molecular weight of about 1,000 (Epikote 1001, a trademark for a product of Shell Chemical Co.) was dissolved in a mixed solvent composed of 305 parts of methyl ethyl ketone and 120 parts of isopropanol. At 90° C., 78.75 parts of diethanolamine was added, and the epoxy resin was reacted with diethanolamine until no free amine was detected. Then, 250 parts of dimeric acid-type polyamide resin (Versamide 125, a tradename for a product of Nippon General Mills Co., Ltd.) having an amine value of 300 and a viscosity of about 100 poises (at 40° C.), which had been treated with methyl isobutyl ketone to ketiminate the terminal primary amino groups, was added, and the reaction was continued at 90° C. until the viscosity of the reaction mixture no longer increased. The reaction mixture was then cooled to 40° C., and then 412.5 parts of the polyisocyanate mixture [I] was charged. The reaction was performed at 60° C. for 2 hours to obtain a resin composition in accordance with this invention.

The resin composition (140 parts) was neutralized with 1.9 parts of acetic acid, and 10 parts of ethylene glycol monobutyl ether and 2 parts of polypropylene glycol having a molecular weight of 4,000 (Sunnix PP-4000, a trademark for a product of Sanyo Chemical Co., Ltd.) were added to form a mixture. Then, 114 parts of deionized water, 3 parts of carbon black, 6 parts of talc and 3 parts of basic lead silicate were added to the mixture, and they were kneaded in a ball mill until the resulting product had a particle diameter of less than 20 microns. The resulting aqueous pigment-dispersed resin composition was diluted with deionized water until the solids content reached 20%. The diluted composition was stirred overnight at 30° C. in an open condition. The component that volatilized was made up for by deionized water, and the composition was used in an electrodeposition test shown below.

Electrodeposition was performed in the electrodeposition bath prepared as above using a zinc phosphate-treated steel plate as a cathode at a direct current of 350 V for 3 minutes. The coated plate was washed with water and baked at 170° C. for 30 minutes to obtain a smooth coated film having a thickness of about 20 microns. The properties of the coated film were superior as shown below.
(1) Two-coat yellowing: E
(2) Throwing power: 26 cm
(3) Salt spray resistance: 1500 hours, acceptable
(4) Impact strength (½ inch, 500 g): 50 cm, acceptable

EXAMPLE 2

Diethylene glycol monoethyl ether (187.6 parts) was added to 250 parts of MDI at 30° C. over the course of 60 minutes. The temperature was gradually raised to 60° C., and the reaction was performed until the remaining isocyanate group content reached 5.8%. GPC analysis showed that the product was polyisocyanate mixture [II] consisting of about 50 mole% of partially blocked MDI, about 45 mole% of completely blocked MDI and about 5 mole% of unreacted MDI.

One thousand (1,000) parts of bisphenol A-type epoxy resin having an epoxy equivalent of 1,000 and a molecular weight of about 1,500 (Araldite 6084, a trademark for a product of Nippon Ciba-Geigy Co., Ltd.) was dissolved in 450 parts of ethylene glycol monoethyl ether acetate (Cellosolve acetate), and 437.6 parts of the polyisocyanate mixture [II] was added at 80° C. They were reacted until the remaining isocyanate group content became substantially zero. The reaction mixture was cooled to 40° C., and 61 parts of monoethanolamine was added. The mixture was maintained at this temperature for several hours to obtain a resin composition in accordance with this invention. The resin composition (130 parts) was neutralized with 3.4 parts of 88% formic acid, and additives and pigments were added in the same way as in Example 1 to form a paint composition. The same electrodeposition as in Example 1 was performed using the paint composition.
Coating conditions: 300 V, 3 minutes
Baking conditions: 190° C., 20 minutes
(1) Two-coat yellowing: G
(2) Throwing power: 24 cm
(3) Salt spray resistance: 2000 hours, acceptable
(4) Impact strength (½ inch, 500 g): 40 cm, acceptable

EXAMPLE 3

2-Ethylhexanol (162.5 parts) was added dropwise at 50° C. to 250 parts of 2,4'-diphenylmethane diisocyanate, and they were reacted until the remaining isocyanate group content reached 7.5% to afford a polyisocyanate mixture [III] composed of about 75 mole% of partially blocked 2,4'-diphenylmethane diisocyanate (mono-adduct), and about 25 mole% of completely blocked 2,4'-diphenylmethane diisocyanate (di-adduct).

Four hundred (400) parts of a bisphenol-A type epoxy resin having an epoxy equivalent of 200 and a molecular weight of about 400 (Epikote 828, a trademark for a product of Shell Chemical Co.) was dissolved in a mixture of 240 parts of methyl ethyl ketone and 120 parts of isopropanol, and at 80° C., 210 parts of diethanolamine was added. The epoxy resin and the amine were reacted for about 2 hours until the unreacted amine was no longer detected. The reaction mixture was cooled to 60° C., and 180 parts (about 23 mole% based on the total amount of the aforesaid partially and completely blocked isocyanates) of dimeric acid-type diisocyanate (DDI 1410, a tradename for a product of Nippon General Mills, Co., Ltd.) and 412.5 parts of the polyisocyanate mixture [III] were added. The reaction was performed for about 2 hours until the unreacted isocyanate groups were no longer detected, to afford a resin composition of this invention. The resin composition (140 parts) was neutralized with 3.2 parts of acetic acid. An electrodepositing paint was prepared, and an electrodeposition test were conducted, in the same way as in Example 1.
Coating conditions: 280 V, 3 minutes
Baking conditions: 200° C., 15 minutes
(1) Two-coat yellowing: E
(2) Throwing power: 21 cm
(3) Salt spray resistance: 1000 hours, acceptable
(4) Impact strength (½ inch, 500 g): 50 cm, acceptable

EXAMPLE 4

In 45 parts of toluene was dissolved 250 parts of 4,4-diphenylmethane diisocyanate, and at 40° C., 201 parts of diethylene glycol monoethyl ether was added. The reaction was carried out until the isocyanate group content was decreased to 4.7% to afford an isocyanate mixture [IV] (consisting of about 45 mole% of the mono-adduct, about 40 mole% of the di-adduct and 15 mole% of the unreacted diisocyanate).

Separately, 500 parts of a bisphenol A-type epoxy resin (Araldite 6071, a trademark for a product of Nippon Ciba-Geigy Co., Ltd.) having a molecular weight of about 1,000 and an epoxy equivalent of about 500 was dissolved in 460 parts of methyl ethyl ketone under heating, and at 80° C., 94.5 parts of diethanolamine was added and reacted for 3 hours. Then, 200 parts of a ketiminated product of dimeric acid-type polyamide resin (Versamide 125) having an amine value of about 300 and a viscosity of about 100 poises (at 40° C.) was added, and reacted at 80° C. for 90 minutes. The reaction mixture was cooled to 60° C., and 24 parts of hexamethylene diisocyanate (12.5 mole% based on the total isocyanate compounds) was added, and they were reacted for 1 hour. Then, the isocyanate mixture [IV] was added, and they were reacted at 80° C. for 2 hours to afford a resin composition in accordance with this invention. The resin composition (140 parts) was neutralized with 1.5 parts of formic acid. Then, pigments were dispersed in the same way as in Example 1, and an electrodeposition test was performed in the same way as in Example 1 (coating conditions: 280 V, 3 minutes).
The results were as follows:
(1) Two-coat yellowing: E
(2) Throwing power: 23.5 cm
(3) Salt spray resistance: 1500 hours, acceptable
(4) Impact strength (½ inch, 1 kg): 50 cm, acceptable

COMPARATIVE EXAMPLE 1

Ethylene glycol monoethyl ether (90 parts) was added dropwise at 30° C. to 174 parts of 2,4-tolylene diisocyanate, and they were reacted at the same temperature until the remaining isocyanate group content reached 15.9%, thereby to form a partially blocked diisocyanate composed of 100% of a mono-adduct. Then, 500 parts of bisphenol A-type epoxy resin having an epoxy equivalent of 500 and a molecular weight of about 1,000 (Araldite 6071, a trademark for a product of Nippon Ciba-Geigy Co., Ltd.) was dissolved in 251 parts of diacetone alcohol methyl ether. Then, at 100° C., 264 parts of the partially blocked diisocyanate was added, and reacted until the remaining isocyanate group content became substantially zero. The reaction mixture was cooled at 80° C., and 73 parts of diethylamine was added. The reaction was performed until the unreacted amine was no longer detected. Lactic acid (6.3 g) was added to 130 parts of the resulting resin composition, and 2 parts of dibutyltin dilaurate was added. The same pigments as used in Example 1 were dispersed to form an electrodepositing paint. Using the paint, the same electrodeposition coating test as in Example 1 was carried out.

Coating conditions: 250 V, 3 minutes
Baking conditions: 185° C., 30 minutes
(1) Two-coat yellowing: B
(2) Throwing power: 17 cm
(3) Salt spray resistance: 1000 hours, acceptable
(4) Impact strength (½ inch, 500 g): 30 cm, acceptable

EXAMPLE 5

In 150 parts of toluene was dissolved 420 parts of crude MDI (Sumudur MV-20, a trademark for a product of Sumitomo Bayer Urethane Co., Ltd.) expressed by the following chemical formula.

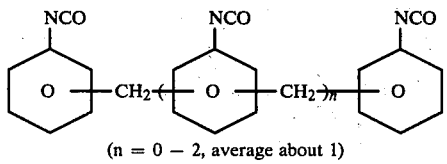

(n = 0 − 2, average about 1)

Then, at 50° C., 180 parts of ethylene glycol monoethyl ether was added, and the mixture was heated to 70° C. The reaction was performed at 70° C. until the isocyanate group content was decreased to 7.0%. GPC analysis showed that a polyisocyanate mixture [V] was obtained which consisted of about 30 mole% of diisocyanate, about 60 mole% of monoisocyanate, and about 10 mole% of fully blocked product.

Then, 50 parts of bisphenol A-type epoxy resin (Epikote 828, a trademark for a product of Shell Chemical Co.) having an epoxy equivalent of 200 and a molecular weight of about 400 and 375 parts of bisphenol A-type epoxy resin having an epoxy equivalent of about 500 and a molecular weight of about 1,000 (Araldite 6071, a trademark for a product of Nippon Ciba-Geigy Co., Ltd.) were dissolved in a mixture of 190 parts of methyl ethyl ketone and 190 parts of t-butanol. At 80° C., 105 parts of diethanolamine was added to the solution, and they were reacted for about 3 hours until the unreacted amine was no longer detected. Then, 290 parts of dimeric acid-type polyamide resin having an amine value of 300 and a viscosity of about 100 poises (at 40° C.) (Tohmide 225x, a trademark for a product of Fuji Chemical Co., Ltd.), which had been treated with methyl is butyl ketone to ketiminate the terminal primary amino groups, was added, and the reaction was performed at 80° C. for 1 hour. Then, 562.5 parts of the aforesaid polyisocyanate mixture [V] was gradually added at 60° C. to the reaction mixture, and the reaction was performed at 80° C. for 1 hour to afford a resin composition in accordance with this invention.

The resin composition (139 parts) was neutralized with 1.6 parts of acetic acid, and 1.5 parts of polypropylene glycol having a molecular weight of 2,000 (Sunnix PP-2000, a trademark for a product of Sanyo Chemical Co., Ltd.) was mixed with the neutralized resin composition. Then, 116 parts of deionized water, and the same pigments as used in Example 1 were added to form an electrodepositing paint composition. Using the paint composition, the same electrodeposition test as in Example 1 was performed.

Coating conditions: 300 V, 3 minutes
Baking conditions: 180° C., 20 minutes
(1) Two-coat yellowing: E
(2) Throwing power: 25 cm
(3) Salt spray resistance: 1,000 hours, acceptable
(4) Impact strength (½ inch, 500 g): 50 cm acceptable

EXAMPLE 6

In 117 parts of xylene was dissolved 210 parts of 1,5-naphthalene diisocyanate, and at 60° C., 72 parts of ethylene glycol monoethyl ether was added dropwise. The mixture was maintained at 60° C. for 1 hour. Then, the temperature was raised to 80° C., and at this temperature, the reaction was performed until the isocyanate group content reached 18%. Thus, a polyisocyanate mixture [VI] was obtained which consisted of about 35 mole% of diisocyanate, about 50 mole% of monoisocyanate and about 15 mole% of a fully blocked product.

Then, 400 parts of bisphenol A-type epoxy resin having an epoxy equivalent of 200 and a molecular weight of about 400 (Epikote 828, a tradename for a product of Shell Chemical Co.) was dissolved in 234 parts of isopropanol, and 210 parts of diethanolamine was added. At 80° C., they were reacted until the unreacted amine was no longer detected by tracing the tertiary amine value of the product. Then, 798 parts of the polyisocyanate mixture [VI] was gradually added at 60° C., and at 70° C., the mixture was reacted until the isocyanate group content became zero, thereby to obtain a resin composition in accordance with this invention.

The resin composition (140 parts) was neutralized with 5.1 parts of acetic acid, and an electrodepositing paint composition was prepared in the same way as in Example 1. An electrodeposition test was conducted in the same way as in Example 1 using the electrodepositing paint composition.

Coating conditions: 250° C., 3 minutes
Baking conditions: 185° C., 20 minutes
(1) Two-coat yellowing: G
(2) Throwing power: 20 cm
(3) Salt spray resistance: 800 hours, acceptable
(4) Impact strength (½ inch, 500 g): 50 cm, acceptable

EXAMPLE 7

In 129 parts of xylene was dissolved 264 parts of ortho-lysine diisocyanate, and 120 parts of diethylene glycol monoethyl ether was added dropwise at 60° C. They were reacted further at 80° C. until the isocyanate group content was decreased to 10% to afford a polyisocyanate mixture [VII] consisting of about 30 mole% of diisocyanate, 50 mole% of monoisocyanate, and about 20 mole% of fully blocked isocyanate.

Then, 500 parts of bisphenol-type epoxy resin having an epoxy equivalent of 500 and a molecular weight of about 1000 (Araldite 6071, a tradename for a product of Nippon Ciba-Geigy Co., Ltd.) was dissolved in 387 parts of methyl ethyl ketone, and 105 parts of diethanolamine was added. They were reacted at 80° C. until the unreacted amine was no longer detected by tracing the tertiary amine value of the reaction mixture. Three hundred (300) parts of the same ketiminated product of polyamide resin as used in Example 1 was added, and the reaction was performed at 80° C. for 1 hour. Then, 513 parts of the aforesaid polyisocyanate mixture [VII] was added gradually at 60° C., and the temperature was raised to 80° C. At this temperature, the reaction was continued for 1 hour to afford a resin composition in accordance with this invention.

The resin composition (140 parts) was neutralized with 2.1 parts of acetic acid, and an electrodepositing composition was prepared in the same way as in Example 1. Using the electrodepositing paint composition, an electrodeposition test was performed in the same way as in Example 1.

Coating conditions: 300 V, 3 minutes
Baking conditions: 180° C., 20 minutes
(1) Two-coat yellowing: E
(2) Throwing power: 25 cm
(3) Salt spray resistance: 1000 hours, acceptable
(4) Impact strength (½ inch, 1 kg): 50 cm, acceptable

What we claim is:

1. A resin composition for cationic electrodepositing paints which has a high throwing power and does not foul a top coated film and is particularly suitable for two-coat finishing, said resin composition comprising the reaction product of
   [A] a basic polyamino resin containing amino groups and/or hydroxyl groups capable of reacting with isocyanate groups, with
   [B] a polyisocyanate mixture composed of
      (i) 40 to 95 mole% of a low-volatile partially blocked aromatic polyisocyanate containing at least two benzene rings having an isocyanate group directly bonded to a nuclear carbon atom, in which substantially all isocyanate groups except one are blocked with an alcohol,
      (ii) 2.5 to 50 mole% of a low-volatile fully blocked aromatic polyisocyanate containing at least two benzene rings having an isocyanate group directly bonded to a nuclear carbon atom, and
      (iii) 2.5 to 40 mole% of a difunctional polyisocyanate,
the mole percentages being based on the total amount of the polyisocyanates (i), (ii) and (iii).

2. The composition of claim 1 wherein said basic polyamino resin is an adduct formed between a polyglycidyl ether-type epoxy resin and a monoamine or polyamine containing at least one basic amino group.

3. The composition of claim 1 wherein the basic polyamino resin is the reaction product between an amine/epoxy adduct and a basic polyamide resin.

4. The composition of claim 1 wherein said basic polyamino resin contains 1 to 10 amino groups and/or 1 to 20 hydroxyl groups per 1000 g of the resin.

5. The composition of claim 1 wherein the basic polyamino resin has a number average molecular weight of 500 to 10,000.

6. The composition of claim 1 wherein the aromatic polyisocyanates are selected from the group consisting of compounds of the following formulae

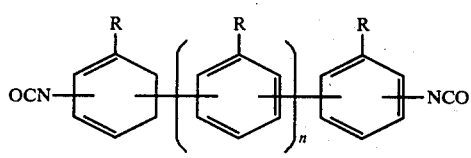

(I)

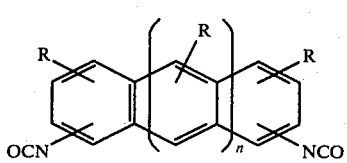

(II)

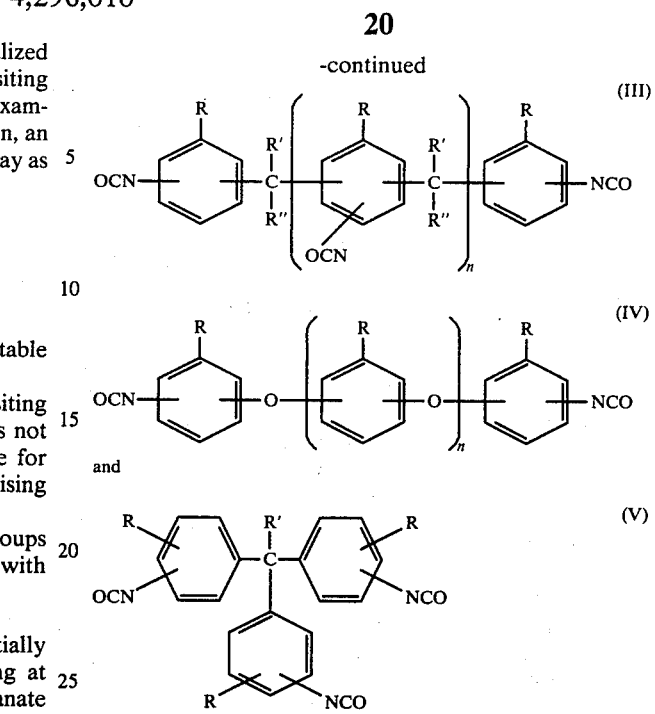

wherein R, R' and R" each represent a hydrogen atom, a lower alkyl group, preferably a methyl group, or a lower alkoxy group, preferably a methoxy group, and n is 0 or an integer of 1 to 4, preferably 0 or an integer of 1 or 2.

7. The composition of claim 1 wherein said aromatic polyisocyanates are 4,4'-diphenylmethane diisocyanate.

8. The composition of claim 1 wherein said polyisocyanate mixture is composed of (i) 50 to 90 mole% of said low-volatile partially blocked aromatic polyisocyanate, (ii) 5 to 45 mole% of said low-volatile completely blocked aromatic polyisocyanate, and (iii) 5 to 25 mole% of said difunctional polyisocyanate.

9. The composition of claim 1 wherein said reaction mixture contains blocked isocyanate groups in an amount corresponding to about ½ to 1 equivalent time the total amount of the unreacted amino groups and/or hydroxyl groups.

10. An aqueous bath for cationic electrodeposition, said bath comprising
   [I] the reaction product of
   [A] a basic polyamino resin containing amino groups and/or hydroxyl groups capable of reacting with isocyanate groups, with
   [B] a polyisocyanate mixture composed of
      (i) 40 to 95 mole% of a low-volatile partially blocked aromatic polyisocyanate containing at least two benzene rings having an isocyanate group directly bonded to a nuclear carbon atom, in which substantially all isocyanate groups except one are blocked with an alcohol,
      (ii) 2.5 to 50 mole% of a low-volatile fully blocked aromatic polyisocyanate containing at least two benzene rings having an isocyanate group directly bonded to a nuclear carbon atom, and
      (iii) 2.5 to 40 mole% of a difunctional polyisocyanate,
the mole percentages being based on the total amount of the polyisocyanates (i), (ii) and (iii),

[II] a water-soluble aqueous inorganic or organic acid as a neutralization agent for said reaction product [I], and

[III] an aqueous medium.

11. The aqueous bath of claim 10 which contains 3 to 30% by weight, as solids, of said reaction product [I] based on the weight of the aqueous bath.

12. The aqueous bath of claim 10 which has a pH in the range of about 3 to about 8.

13. In a method of electrodeposition coating of an electrically conductive surface serving as a cathode which comprises passing an electric current across said cathode and an anode in contact with an aqueous electrodepositable composition; the improvement wherein said electrodepositable composition comprises

[I] the reaction product of
  [A] a basic polyamino resin containing amino groups and/or hydroxyl groups capable of reacting with isocyanate groups, with
  [B] a polyisocyanate mixture composed of
    (i) 40 to 95 mole% of a low-volatile partially blocked aromatic polyisocyanate containing at least two benzene rings having an isocyanate group directly bonded to a nuclear carbon atom, in which substantially all isocyanate groups except one are blocked with an alcohol,
    (ii) 2.5 to 50 mole% of a low-volatile fully blocked aromatic polyisocyanate containing at least two benzene rings having an isocyanate group directly bonded to a nuclear carbon atom, and
    (iii) 2.5 to 40 mole% of a difunctional polyisocyanate, the mole percentages being based on the total amount of the polyisocyanates (i), (ii) and (iii),

[II] a water-soluble aqueous inorganic or organic acid as a neutralization agent for said reaction product [I], and

[III] an aqueous medium.

14. A primer-coated article obtained by the method of claim 13 wherein a subsequent top-coating, which has been coated on the primer, is not discolored or deteriorated, while baking.

* * * * *